United States Patent
Chapman et al.

(10) Patent No.: US 10,597,255 B2
(45) Date of Patent: Mar. 24, 2020

(54) ELEVATOR ROUTE SELECTION SYSTEM

(71) Applicant: Otis Elevator Company, Farmington, CT (US)

(72) Inventors: Ashley Chapman, Plainville, CT (US); Bradley Armand Scoville, Farmington, CT (US); Eric C. Peterson, East Longmeadow, MA (US); Paul A. Simcik, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 360 days.

(21) Appl. No.: 15/535,120

(22) PCT Filed: Dec. 9, 2015

(86) PCT No.: PCT/US2015/064651
§ 371 (c)(1),
(2) Date: Jun. 12, 2017

(87) PCT Pub. No.: WO2016/094491
PCT Pub. Date: Jun. 16, 2016

(65) Prior Publication Data
US 2017/0362052 A1     Dec. 21, 2017

Related U.S. Application Data

(60) Provisional application No. 62/091,125, filed on Dec. 12, 2014.

(51) Int. Cl.
*B66B 1/34* (2006.01)
*G06F 16/435* (2019.01)
(Continued)

(52) U.S. Cl.
CPC .......... *B66B 1/3461* (2013.01); *B66B 1/2408* (2013.01); *B66B 1/2466* (2013.01); (Continued)

(58) Field of Classification Search
CPC ....... B66B 1/3461; B66B 1/46; B66B 1/2466; B66B 1/2408; B66B 1/468;
(Continued)

(56) References Cited

U.S. PATENT DOCUMENTS

| 6,397,976 B1 | 6/2002 | Hale et al. |
| 7,347,303 B2 | 3/2008 | Kontturi et al. |

(Continued)

FOREIGN PATENT DOCUMENTS

| CN | 1035092 A | 8/1989 |
| CN | 1415527 A | 5/2003 |

(Continued)

OTHER PUBLICATIONS

International Search Report and Written Opinion for application PCT/US2015/064651, dated Mar. 2, 2016, 10pgs.
(Continued)

*Primary Examiner* — Jeffrey Donels
(74) *Attorney, Agent, or Firm* — Cantor Colburn LLP

(57) ABSTRACT

A method and system for providing destination dispatch in an elevator control system, includes identifying a user, retrieving a user profile associated with the user, receiving a destination request associated with the user, analyzing the user profile and the destination request, determining a plurality of assignments, identifying a preferred assignment of the plurality of assignments, and prompting the user to opt-out of the preferred assignment.

11 Claims, 2 Drawing Sheets

(51) Int. Cl.
  *B66B 1/46* (2006.01)
  *B66B 1/24* (2006.01)
(52) U.S. Cl.
  CPC .............. *B66B 1/46* (2013.01); *B66B 1/468* (2013.01); *G06F 16/437* (2019.01); *B66B 2201/103* (2013.01); *B66B 2201/104* (2013.01); *B66B 2201/4615* (2013.01)
(58) Field of Classification Search
  CPC ........ B66B 2201/104; B66B 2201/103; B66B 2201/4615; G06F 16/437
  USPC ........................................................ 187/247
  See application file for complete search history.

(56) References Cited

U.S. PATENT DOCUMENTS

| | | | |
|---|---|---|---|
| 7,377,364 | B2 | 5/2008 | Tyni et al. |
| 8,132,652 | B2 | 3/2012 | Hakala et al. |
| 8,348,021 | B2 | 1/2013 | Finschi |
| 8,387,756 | B2 | 3/2013 | Laihanen et al. |
| 2008/0067013 | A1 | 3/2008 | Ylinen et al. |
| 2012/0037461 | A1 | 2/2012 | Finschi |
| 2012/0279808 | A1 | 11/2012 | Terry |
| 2013/0297093 | A1* | 11/2013 | Nowel ................ B66B 1/468 700/299 |
| 2014/0041968 | A1 | 2/2014 | Tokura |
| 2014/0151160 | A1 | 6/2014 | Joyce et al. |
| 2016/0311647 | A1* | 10/2016 | Peterson ............... B66B 1/3461 |
| 2016/0325962 | A1* | 11/2016 | Blandin ................. B66B 1/468 |
| 2018/0118512 | A1* | 5/2018 | Baldi ..................... B66B 1/468 |
| 2018/0127235 | A1* | 5/2018 | Scoville ................. B66B 1/468 |
| 2018/0282113 | A1* | 10/2018 | Simcik .................. B66B 1/468 |

FOREIGN PATENT DOCUMENTS

| | | |
|---|---|---|
| CN | 102616614 A | 8/2012 |
| CN | 106185498 A | 12/2016 |
| JP | H06321445 A | 11/1994 |
| JP | 2003276957 A | 10/2003 |
| JP | 2007261753 A | 10/2007 |
| JP | 2014156356 A | 8/2014 |
| WO | 2012093985 A1 | 7/2012 |
| WO | 2013033879 A1 | 3/2013 |
| WO | 2013182739 A1 | 12/2013 |
| WO | 2014032855 A1 | 3/2014 |
| WO | 2014096529 A1 | 6/2014 |

OTHER PUBLICATIONS

KONE, "KONE RemoteCall, Smartphone Application for KONE Polaris™ 900 Destination Control System", available at http://cdn.kone.com/www.kone.ae/en/Images/kone-remotecall-factsheet.pdf?v=1, published Sep. 10, 2013, 2pgs.
Chinese First Office Action and Search Report for application CN 201580067769.8, dated Nov. 7, 2018, 11 pages.
Chinese Second Office Action for application 201580067769.8, dated Jul. 5, 2019, 7 pages.
Chinese Third Office Action for application CN 201580067769.8, dated Sep. 30, 2019, 8 pages.

* cited by examiner

ELEVATOR ROUTE SELECTION SYSTEM

FIELD OF THE INVENTION

The subject matter disclosed herein relates to control operations in an elevator system, and to a system and a method for selecting routes for passengers of an elevator system.

DESCRIPTION OF RELATED ART

Typically, destination dispatch elevator systems are used to provide elevator car assignments in response to a user's floor selection. For example, a destination dispatch system may provide an elevator car assignment or a list of potential elevator car assignments based on car usage and user demand. Advantageously, destination dispatch systems may improve elevator system efficiency and decrease user wait times.

Destination dispatch systems are often used with a variety of applications and users. Certain application and users often have different objectives, requirements, and desires. Current destination dispatch systems provide a calculated optimal car assignment by analyzing predetermined parameters, often leading to car assignments that are not aligned with a user's preferences at a given time, such as desired car occupancy, wait time, and travel time. A system and method that can provide destination dispatch car assignments considering user preferences and inputs is desired.

BRIEF SUMMARY

According to an embodiment of the invention, a method for providing destination dispatch in an elevator control system, includes identifying a user, retrieving a user profile associated with the user, receiving a destination request associated with the user, analyzing the user profile and the destination request, determining a plurality of assignments, identifying a preferred assignment of the plurality of assignments, and prompting the user to opt-out of the preferred assignment.

In addition to one or more of the features described above, or as an alternative, further embodiments could include receiving an alternative assignment of the plurality of assignments from the user.

In addition to one or more of the features described above, or as an alternative, further embodiments could include storing the destination request in the user profile.

In addition to one or more of the features described above, or as an alternative, further embodiments could include identifying the user via a portable device.

In addition to one or more of the features described above, or as an alternative, further embodiments could include that the user profile includes at least one user preference affecting the preferred assignment.

In addition to one or more of the features described above, or as an alternative, further embodiments could include that the at least one user preference includes a preference priority.

In addition to one or more of the features described above, or as an alternative, further embodiments could include transmitting the user profile to the elevator control system.

In addition to one or more of the features described above, or as an alternative, further embodiments could include storing the user profile in the elevator control system.

According to an embodiment of the invention, a system for providing destination dispatch in an elevator control system, includes a user interface to identify a user, retrieve a user profile associated with the user, and receive a destination request associated with the user, and a controller to analyze the user profile and the destination request to determine a plurality of assignments, wherein the user interface identifies a preferred assignment of the plurality of assignments and prompts the user to opt-out of the preferred assignment.

In addition to one or more of the features described above, or as an alternative, further embodiments could include that the user interface receives an alternative assignment of the plurality of assignments from the user.

In addition to one or more of the features described above, or as an alternative, further embodiments could include that the destination request is stored in the user profile.

In addition to one or more of the features described above, or as an alternative, further embodiments could include that a portable device communicates with the user interface to identify the user.

In addition to one or more of the features described above, or as an alternative, further embodiments could include that the user profile includes at least one user preference affecting the preferred assignment.

In addition to one or more of the features described above, or as an alternative, further embodiments could include that the at least one user preference includes a preference priority.

In addition to one or more of the features described above, or as an alternative, further embodiments could include that the user profile is transmitted to the elevator control system.

Technical function of the embodiments described above includes identifying a user, analyzing the user profile and the destination request, identifying a preferred assignment of the plurality of assignments, and prompting the user to opt-out of the preferred assignment.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Figure 1:
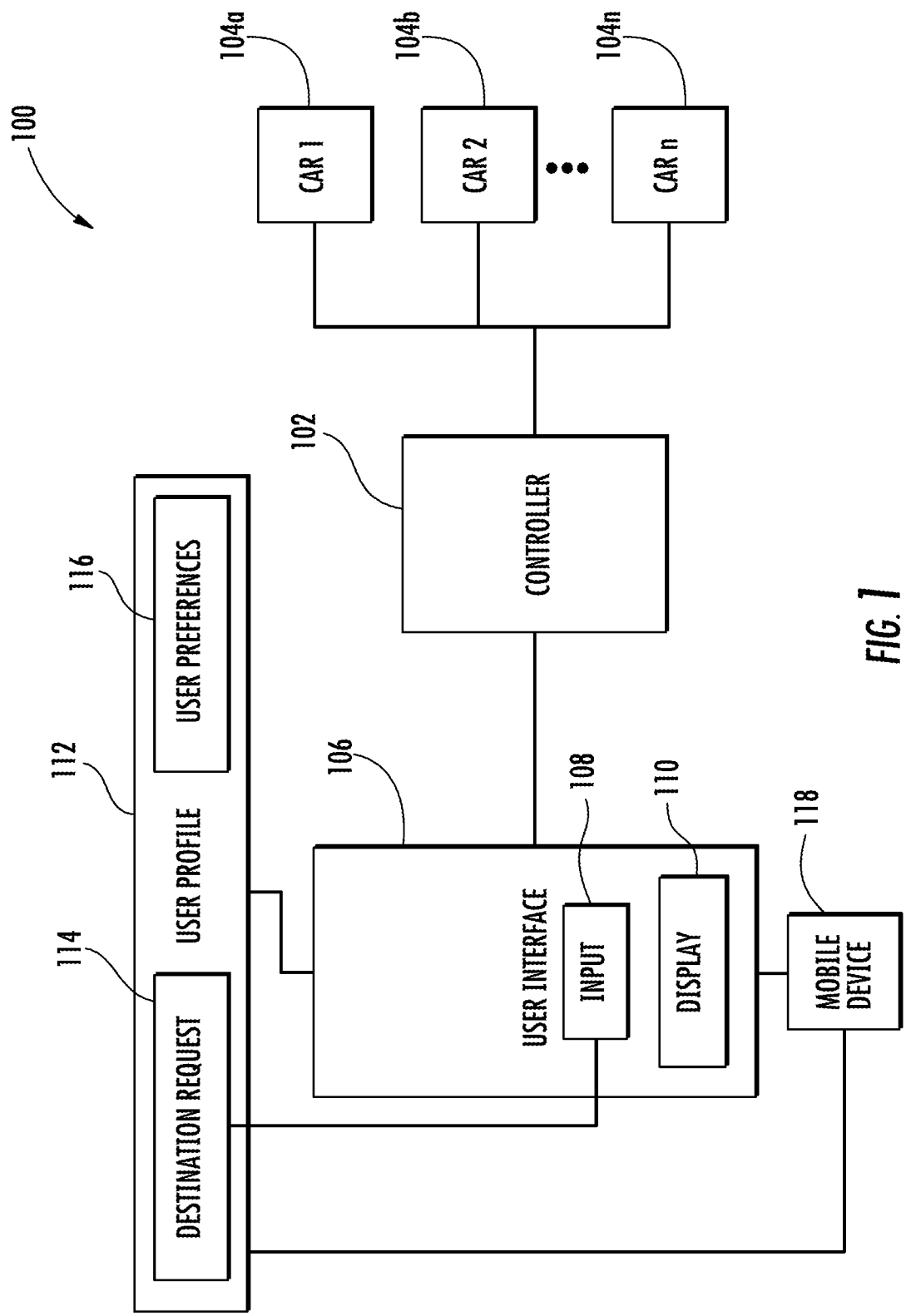
FIG. 1 illustrates a schematic view of an exemplary control system in accordance with an embodiment of the invention.

Referring now to the drawings, FIG. 1 illustrates a schematic view of an exemplary control system 100 with route selection in accordance with an embodiment of the invention. In an embodiment, system 100 is an elevator system with controller 102 to provide destination dispatch routing with route selection functionality. System 100 includes controller 102 to control the operation of cars 104a-n. Controller 102 interacts with users via user interface 106.

User interface 106 allows a user to interface with the elevator system 100. Users may be individual users, such as an employee in a workplace, or a group of users with common preferences, such as employees all working the same shift on the same floor of a building with elevators. In an exemplary embodiment, elevator system 100 utilizes destination dispatch routing, which requires destination information before entering a car 104a-104n. In a destination dispatch system, the user selects their desired floor via a user interface 106. In an exemplary embodiment, user interface 106 is a physical interface. The user interface 106 may be located in a central kiosk, a sky lobby, an intermediate lobby of a building, or any other suitable location with elevator system 100. In an alternative embodiment, user interface 106 is a virtual interface to allow users to enter and receive information through other devices, such as portable devices 118, including but not limited to, cell phones or other alternative devices. In alternative embodiments, user interface 106 is a physical device that allows alternative interfacing via portable devices 118.

In an exemplary embodiment, user interface 106 receives information via input 108 for use by controller 102. In an exemplary embodiment, input 108 is a physical input, such as a keypad to enter destination requests. In certain embodiments, input 108 also allows for the identification of users to allow the retrieval of corresponding user profiles. In certain embodiments, input 108 is a virtual input that allows communication from other suitable devices including mobile devices 118 to allow input of destination requests, identification of users and other user inputs.

In an exemplary embodiment, user interface 106 communicates system outputs via display 110. Display 110 may be a physical display that shows information such as identification confirmation, car assignment, system status, car status, and other relevant information. In certain embodiments, display 110 is a virtual display that outputs information to external devices, such as computers, televisions, external displays and mobile devices 118. In an exemplary embodiment, display 110 provides system status information, route options, and allows the user to see their car assignment in accordance with the route selection discussed herein.

In an exemplary embodiment, a user provides a destination request 114 via input 108. A destination request may include information such as the source floor, destination floor, opening information, and any other suitable information required by the elevator system 100. In certain embodiments, a user can provide a destination request via a physical keypad or otherwise fixed input methods, touchscreen, etc. In other embodiments, the destination request 114 is transmitted or communicated via mobile device 118 or profile 112.

In an exemplary embodiment, users are identified by the elevator system 100. Users may self-identify or be automatically identified. In certain embodiments, users can self-identify by entering a corresponding identification code, such as their name or a numerical code. In other embodiments, users can be identified by a mobile device 118, such as, but not limited to mobile phones, RFID badges, fobs, etc. In certain embodiments, elevator system 100 can recognize characteristics of users via other recognition techniques.

In an exemplary embodiment, after a user is identified, the identified user is associated with a user profile 112. A user profile 112 may contain user information relevant to elevator operation. In certain embodiments, the user profile 112 contains a destination request 114. In certain embodiments, user profile 112 specifies different destination requests 114 according to time of day, day of the week, employer, organizational affiliation, etc. In other embodiments, destination request 114 is entered independently of user profile 112. In certain embodiments, stored destination requests 114 are used for future determinations made by controller 102.

In an exemplary embodiment, user profile 112 includes user preferences 116. User preferences may include preferences that affect car selection, such as weighted preferences for assignments that provide the fastest route, the least lobby waiting time, the least in car waiting time, the least crowded elevator car, and other suitable preferences 116. User preferences 116 may also specify if a user is willing to arrive "near" a destination and take another mode (e.g., stairs, escalator) to their desired destination. In an exemplary embodiment, user preferences 116 are weighted or prioritized to allow conflicting preferences to be resolved and allow controller 102 to make a desirable assignment.

In an exemplary embodiment, user profiles 112 and corresponding user preferences 116 can be stored and retrieved from elevator controller 102, cloud storage, companywide storage, campus level storage, building level storage, or any suitable location to store user information. In an alternative embodiment, user profiles 112 and corresponding user information are portable and transferred to elevator system 100 via a mobile device 118, such as a mobile phone, RFID badge, RFID fob, etc. User profiles 112 may be resident on mobile device 118. User profiles 112 may be retrieved by user self-initiation, or automatically.

In certain embodiment, destination requests 114 can be remotely sent to interface 106 or scheduled from information available from user profiles 112. Destination requests 114 may be scheduled at desired times in accordance with a user profile 112. Accordingly, controller 102 and interface 106 may summon a user or inform a user if a car assignment that meets the user's preferences is available. In an alternative embodiment, elevator system 100 can inform a user via interface 106 of the optimal time to go to an elevator assignment. In certain embodiments, remote or scheduled destination requests 114 are used in conjunction with mobile device 118 to show an estimated time of arrival or remotely provide an elevator car assignment.

In an exemplary embodiment, controller 102 controls the dispatch, location, and general operation of cars 104a-n. In an exemplary embodiment, destination dispatch routing is used. In destination dispatch routing, controller 102 may use the user's desired destination (destination request 114) to determine the "best" car assignment for the user, based on that user's preferences 116 in the user profile 112.

Typically, destination dispatch routing systems only use a few parameters to determine car assignments for users. Such parameters may include the destination request 114 entered, the current state of cars 104a-104n, and other destination requests 114 entered by other users. In an exemplary embodiment, the controller 102 can dispatch and assign cars 104a-104n based upon the above described parameters of a conventional destination dispatch system, but also analyze user preferences 116 to further determine potential car assignments.

Therefore, in an exemplary embodiment, controller 102 can assign cars 104a-104n to users based on user preferences 116 such as cars with the least wait time, cars with least travel time, the least crowded cars, other suitable preferences or a weighted combination thereof. In certain embodiments, controller 102 can map multiple destinations together if a user preference 116 indicates that a specific user is willing to take the stairs or an alternative elevator to arrive at their destination. Advantageously, controller 102 may still utilize conventional destination dispatch methods, but may further optimize car selection based on user preferences 116.

In an exemplary embodiment, controller 102 analyzes the user preferences 116 and their assigned relative priorities, along with current car 104a-104n states to determine user assignments. In an exemplary embodiment, the controller 102 determines a "best car" assignment that most closely fits the weighted user preferences 116, car state parameters, and destination request 114. In an exemplary embodiment, the "best" car assignment becomes the default assignment that is presented to the user.

In an exemplary embodiment, controller 102 further provides additional assignments for cars 104a-104n. Advantageously, since a user may have preferences or desires that depart from their corresponding profile 112, controller 102 may provide alternatives that allow the user to "opt out" of the selected assignment. In certain embodiments, the alternative assignments are created using typical destination dispatch methods that monitor car 104a-104n states, destination request 114, and other user's destination requests. In other embodiments, alternative assignments are made by satisfying additional or alternative user preferences 116. In an exemplary embodiment, the preferred assignment and alternative assignments are presented to the user via display 110 and allows the user to "opt out" of the preferred assignment if desired. In certain embodiments, the user is prompted to "opt out" by selecting the current assignment is undesirable, requiring an alternative assignment to be assigned. In an alternative embodiment, the user is prompted to "opt out" by selecting an alternative assignment determined by controller 102.

Figure 2:
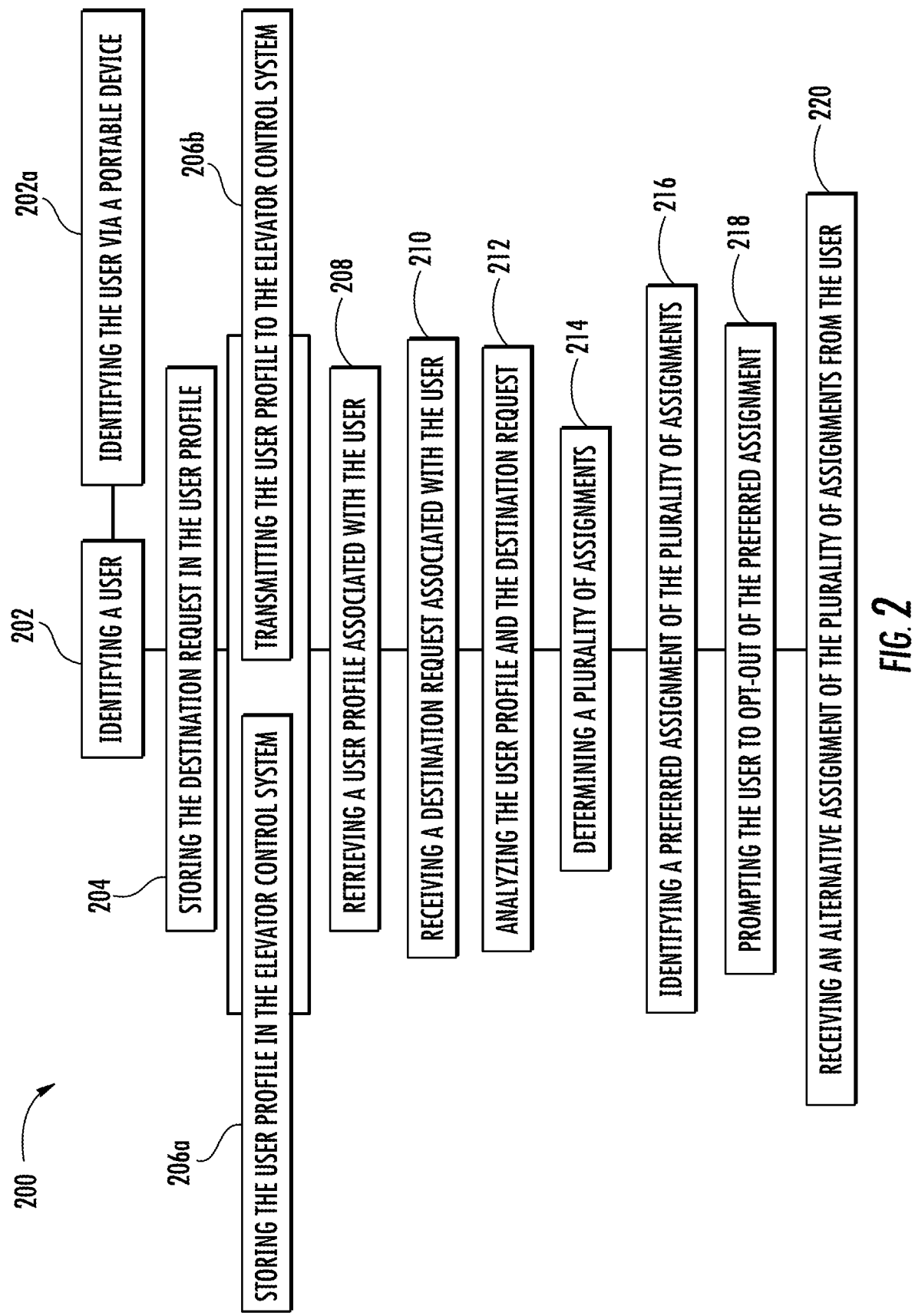
FIG. 2 is a flow diagram of a method of providing destination dispatch service in accordance with an embodiment of the invention.

FIG. 2 illustrates a method 200 for destination dispatch with route selection. In operation 202 a user is identified. In an exemplary embodiment, the user may be identified by entering unique information such as a name, a username, an identification number or any other suitable method for identifying a user. In certain embodiments, user characteristics may be utilized to identify a user. In certain embodiments, in operation 202a a user is identified using a portable or mobile device. Mobile devices may include mobile phones, RFID badges, RFID fobs, or any other suitable method for identifying a user.

In certain embodiments, in operation 204, specific destination requests are stored in a user profile to be retrieved at certain times. Accordingly, in certain embodiments, destination requests may be associated with certain profiles, in accordance with time of the day, day of the week, etc. Advantageously, after a user is identified, the elevator system does not require a destination request to be entered by the user.

In certain embodiments, in operation 206a, user profiles associated with users are stored in the elevator control system. In certain embodiments, the profiles are stored at an organization-wide level, campus level, building level, etc.

In other embodiments, in operation 206b, user profiles are stored externally and transferred to the control system. In certain embodiments, a user carries a portable user profile via a mobile device, such as a mobile phone, a badge, fob or any other suitable device.

In operation 208 a corresponding user profile is retrieved by elevator system. As described above, the user profile may be stored locally or externally.

In operation 210 a destination request is received. In certain embodiments, the destination request is a separate input provided by the user. In other embodiments, the destination request is received and interpreted from the user profile. In other embodiments, the destination request is received based on historical data in the user profile identifying prior destination requests for the user. In certain embodiments, the destination request may reflect the time of day or other conditional parameters to determine the desired user destination.

In operation 212 the controller analyzes the destination request in light of the user preferences stored in the user profile. In certain embodiments, the controller further analyzes current car states, other user's destination requests, and other suitable conditions to determine car assignments for the user. In certain embodiments, the user's preferences are weighted to allow user preferences to be prioritized.

In operation 214 a plurality of car assignments are determined. In an exemplary embodiment, user preferences, elevator system status, and other destination requests are utilized to determine a plurality of assignments. The plurality of assignments may represent various methods of car selection that prioritize different factors, such as wait time, travel time, car occupancy, etc.

In operation 216 a preferred assignment is determined. In an exemplary embodiment, the preferred assignment is selected as the assignment that best satisfies the weighted user preferences. In an exemplary embodiment, the preferred assignment is displayed to the user as the default car assignment.

In operation 218, the user is given an option to "opt out" of the preferred assignment for one of the other alternative assignments determined. In an exemplary embodiment, the alternative assignments include assignments determined by weighing user preferences in another manner, providing assignments that prioritize minimizing wait time, travel time, occupancy, etc.

In operation 220, if an alternative assignment is chosen, the system will confirm that assignment and direct the user toward the assigned elevator car to execute the destination dispatch.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for providing destination dispatch in an elevator control system, comprising:
   identifying a user;
   retrieving a user profile associated with the user, wherein the user profile includes a plurality of user preferences, the plurality of user preferences being weighted to prioritize the plurality of user preferences;
   receiving a destination request associated with the user;
   analyzing the user profile and the destination request;
   determining a plurality of assignments;
   identifying a preferred assignment of the plurality of assignments, the preferred assignment identified in response to the weighted plurality of user preferences; and
   prompting the user to opt-out of the preferred assignment.

2. The method of claim 1, further comprising receiving an alternative assignment of the plurality of assignments from the user.

3. The method of claim 1, further comprising storing the destination request in the user profile.

4. The method of claim 1, wherein identifying the user comprises identifying the user via a portable device.

5. The method of claim 1, further comprising transmitting the user profile to the elevator control system.

6. The method of claim 1, further comprising storing the user profile in the elevator control system.

7. A system for providing destination dispatch in an elevator control system, comprising:
- a user interface to identify a user, retrieve a user profile associated with the user, and receive a destination request associated with the user;
- wherein the user profile includes a plurality of user preferences, the plurality of user preferences being weighted to prioritize the plurality of user preferences; and
- a controller to analyze the user profile and the destination request to determine a plurality of assignments, wherein the user interface identifies a preferred assignment of the plurality of assignments and prompts the user to opt-out of the preferred assignment;
- wherein the preferred assignment is identified in response to the weighted plurality of user preferences.

8. The system of claim 7, wherein the user interface receives an alternative assignment of the plurality of assignments from the user.

9. The system of claim 7, wherein the destination request is stored in the user profile.

10. The system of claim 7, wherein a portable device communicates with the user interface to identify the user.

11. The system of claim 7, wherein the user profile is transmitted to the elevator control system.

* * * * *